(12) United States Patent
Chan

(10) Patent No.: US 11,194,146 B2
(45) Date of Patent: Dec. 7, 2021

(54) IMAGING SYSTEM AND METHOD USING A PROJECTED REFERENCE TO GUIDE ADJUSTMENT OF A CORRECTION OPTIC

(71) Applicant: Molecular Devices, LLC, San Jose, CA (US)

(72) Inventor: Matthew Chan, Palo Alto, CA (US)

(73) Assignee: Molecular Devices, LLC, San Jose, CA (US)

( * ) Notice: Subject to any disclaimer, the term of this patent is extended or adjusted under 35 U.S.C. 154(b) by 122 days.

(21) Appl. No.: 16/268,842

(22) Filed: Feb. 6, 2019

(65) Prior Publication Data
US 2020/0249455 A1 Aug. 6, 2020

(51) Int. Cl.
G02B 21/02 (2006.01)
G02B 21/24 (2006.01)
G02B 21/00 (2006.01)

(52) U.S. Cl.
CPC ......... *G02B 21/02* (2013.01); *G02B 21/0072* (2013.01); *G02B 21/242* (2013.01)

(58) Field of Classification Search
CPC .... G02B 21/02; G02B 21/06; G02B 21/0052; G02B 21/0072; G02B 21/008; G02B 21/242; G02B 21/245
See application file for complete search history.

(56) References Cited

U.S. PATENT DOCUMENTS

| 2009/0090868 A1* | 4/2009 | Payne | G01T 1/295 250/363.06 |
| 2017/0168280 A1* | 6/2017 | Schumann | G02B 7/04 |
| 2017/0184511 A1* | 6/2017 | Den Boef | G03F 9/7065 |

* cited by examiner

*Primary Examiner* — Thomas K Pham
*Assistant Examiner* — Ephrem Z Mebrahtu
(74) *Attorney, Agent, or Firm* — Merchant & Gould P.C.

(57) ABSTRACT

System and method using a projected reference to guide adjustment of a correction optic. In an exemplary method, a reference may be projected onto an imaging detector by propagation of light generally along an optical axis that extends from the reference, through an objective, to a surface of a sample holder, and from the surface, back through the objective, to the imaging detector. The light may propagate through an off-axis aperture located upstream of the imaging detector and spaced from the optical axis. A plurality of images of the reference may be captured using the imaging detector, and with a correction optic at two or more different settings. A setting for the correction optic may be selected based on the plurality of images, and a sample may be imaged while the correction optic has the selected setting.

19 Claims, 12 Drawing Sheets

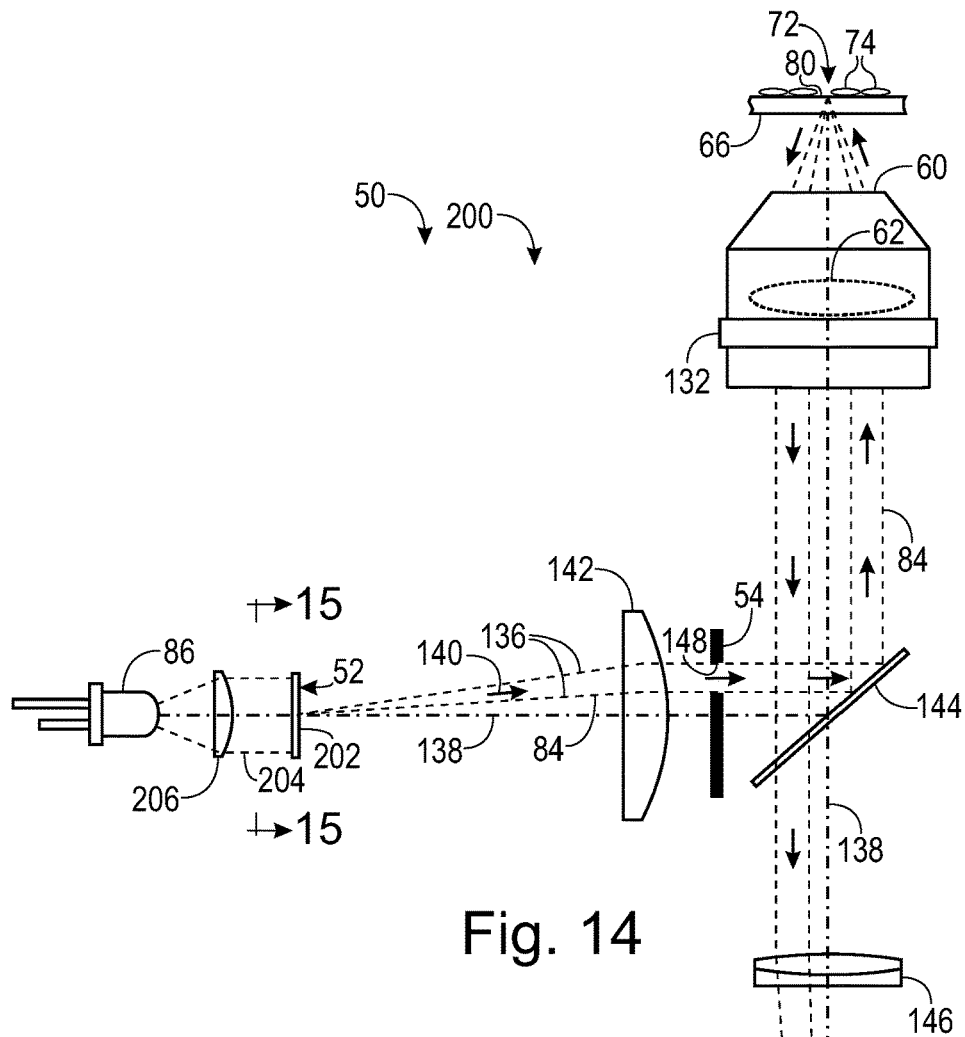
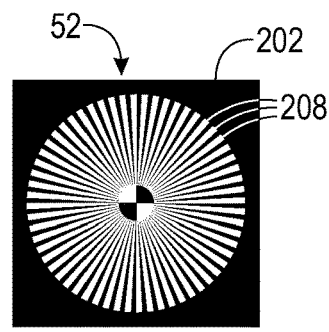
Fig. 14
Fig. 15

IMAGING SYSTEM AND METHOD USING A PROJECTED REFERENCE TO GUIDE ADJUSTMENT OF A CORRECTION OPTIC

INTRODUCTION

A sample composed of tiny objects invisible to the naked eye can be viewed with a microscope while the sample is contained by a holder, such as a microscope slide or a well. The holder, in turn, is supported by a stage such that the sample is aligned with, and at a proper distance from, an objective of the microscope. The objective gathers light from the sample, which is focused to form an image of the sample on the user's retina or the photosensitive area of a detector. A wall of the holder is located intermediate the sample and the objective. Accordingly, light from the sample gathered by the objective has propagated through the wall to reach the objective.

The microscope generally utilizes optical elements having spherical surfaces to refract or reflect light. The optical elements are manufactured with spherical surfaces for practical reasons. However, a spherical surface is inferior to a paraboloidal surface because the spherical surface does not define a single focal point. Instead, the focal point changes along the spherical surface according to the radial distance from the optical axis, which results in a loss of image definition called spherical aberration.

Microscope objectives typically have a system of lens arranged to correct for spherical aberration to improve image quality. These objectives are designed to work best when a coverslip having a standard thickness and refractive index provides the wall intermediate the sample and the objective. (For example, the standard thickness may be 0.17 mm and the standard refractive index may be 1.515.)

Deviation from the standard thickness or refractive index can introduce substantial image aberration. For example, FIG. 1 shows a graph plotting the maximum intensity of a point object in images captured with a microscope, as a function of the thickness error of the coverslip, for objectives having different numerical apertures. The maximum intensity of the point object is a measure of image definition and is inversely related to the amount of aberration. As the numerical aperture is increased, small errors in coverslip thickness become exponentially more significant for reducing image definition.

Microscope objectives often are equipped with a correction collar to compensate for errors in coverslip thickness (and/or a non-standard refractive index). Adjusting the correction collar changes the configuration of lenses within the objective, which can reduce spherical aberration in the image. However, adjustment of the correction collar can be difficult, frustrating, and time-consuming to optimize, because adjustment of the correction collar also can defocus the image.

SUMMARY

The present disclosure provides a system and method using a projected reference to guide adjustment of a correction optic. In an exemplary method, a reference may be projected onto an imaging detector by propagation of light generally along an optical axis that extends from the reference, through an objective, to a surface of a sample holder, and from the surface, back through the objective, to the imaging detector. The light may propagate through an off-axis aperture located upstream of the imaging detector and spaced from the optical axis. A plurality of images of the reference may be captured using the imaging detector, and with a correction optic at two or more different settings. A setting for the correction optic may be selected based on the plurality of images, and a sample may be imaged while the correction optic has the selected setting.

BRIEF DESCRIPTION OF THE DRAWINGS

FIG. 14 is a view of yet another exemplary optical layout for the microscope imaging system of FIG. 6, where the reference is a patterned reference created by a mask, in accordance with aspects of the present disclosure.

FIG. 15 is a view of the mask of FIG. 14, taken generally along line 15-15 of FIG. 14.

DETAILED DESCRIPTION

Figure 1:
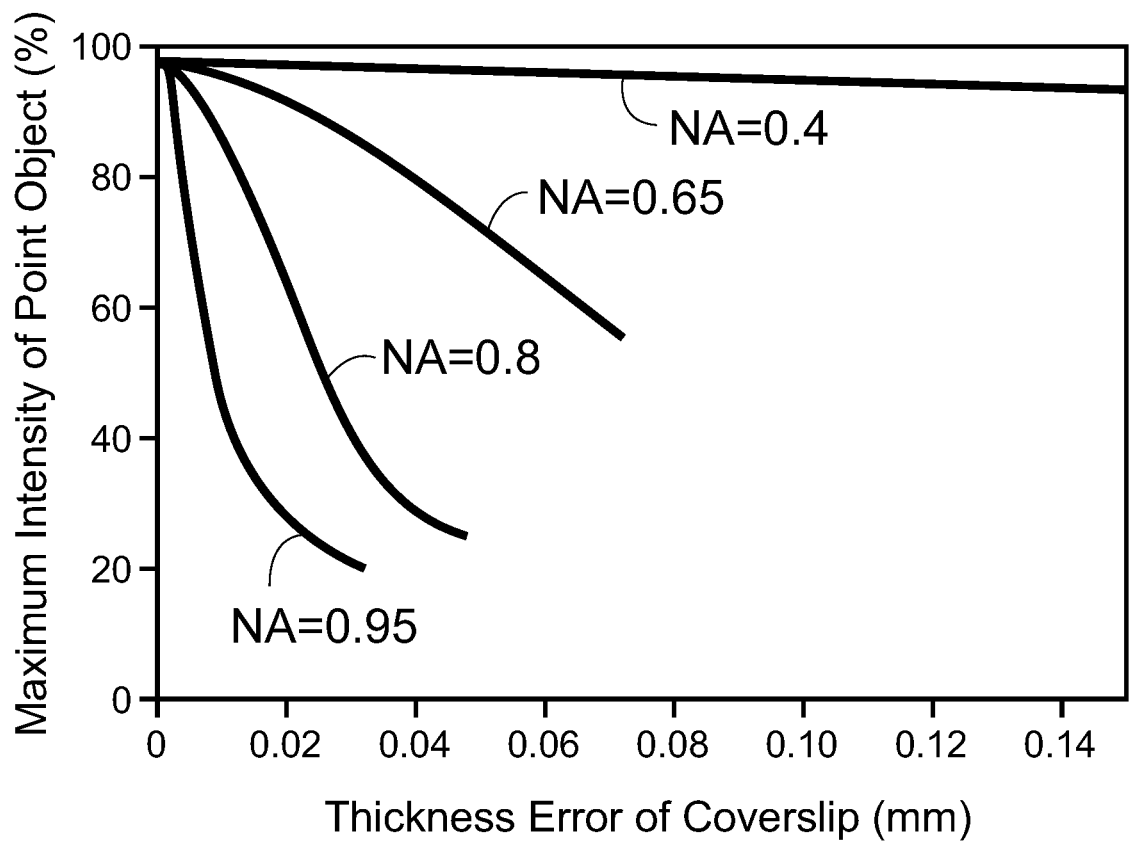
FIG. 1 is a graph plotting the maximum intensity of a point object in images captured with a microscope, as a function of the thickness error of a coverslip through which light passes between the point object and an objective of the microscope, for objectives having different numerical apertures. (See https://www.microscopyu.com/microscopy-basics/coverslip-correction.)

The present disclosure provides a system and method using a projected reference to guide adjustment of a correction optic. In an exemplary method, a reference may be projected onto an imaging detector by propagation of light generally along an optical axis that extends from the reference, through an objective, to a surface of a sample holder, and from the surface, back through the objective, to the imaging detector. The light may propagate through an off-axis aperture located upstream of the imaging detector and spaced from the optical axis. A plurality of images of the reference may be captured using the imaging detector, and with a correction optic at two or more different settings. A setting for the correction optic may be selected based on the plurality of images, and a sample may be imaged while the correction optic has the selected setting.

The imaging system and method disclosed herein utilizing a reference projected via an off-axis aperture offer advantages for focusing and correction of images. First, samples may be imaged with high definition and consistent image quality, even when supported by lower-cost sample holders that have been manufactured with relatively large dimensional tolerances. Second, projecting a reference via an off-axis aperture can make adjustment of an objective and a correction optic more efficient by at least partially decoupling focusing and correction from one another. As a result, respective different image properties obtained from captured images of the reference may indicate whether the image is focused and corrected. For example, at least one of the image properties (e.g., the location and/or shape of the reference in captured images) may be described as a focus property that varies primarily according to the relation axial positions of the objective's front focal point and an object plane defined by a distal surface of a sample holder that reflects light from the reference toward a downstream imaging detector. Accordingly, focusing can be performed predominantly before image correction, by adjusting the objective (and/or stage) based on feedback of values for the focus property from captured images of the reference. Then, image correction can be performed by adjusting the correction optic, while maintaining the focus of the reference (based on the focus property), to optimize at least one other image property (e.g., image contrast and/or reference intensity) based on feedback of values for the at least one other image property from captured images.

Further aspects of the present disclosure are described in the following sections: (I) definitions, (II) system overview, (III) imaging methods, and (IV) examples.

I. DEFINITIONS

Technical terms used in this disclosure have meanings that are commonly recognized by those skilled in the art. However, the following terms may be further defined as described below.

Aperture Member—an optical element having a light-blocking region at least generally surrounding a light-transmissive region (an aperture) through which light passes. The aperture member also may be called an aperture stop. Exemplary light-transmissive regions include openings and holes, such as pinholes, irises, and slits, among others. The light-transmissive region may be occupied by any optically-transparent medium, such as air, glass, plastic, and/or the like. The aperture may be "off-axis" with respect to an optical axis (defined in the absence of the aperture member), which means that the optical axis intersects the light-blocking region, but not the light-transmissive region, of the aperture member. An aperture member may restrict an incident bundle of light rays (an incident light beam) to a spatially restricted subset thereof for propagation downstream of the aperture member. An off-axis aperture may block propagation of central rays, among others, of the incident light beam.

Correction optic—an optical element(s), such as at least one lens and/or at least one mirror, that is adjustable to reduce optical aberration in an imaging system. Adjustment of the correction optic may change the position, configuration, and/or shape, among others, of the correction optic and/or an optical element(s) thereof. The correction optic may reduce any suitable aberration, such as spherical aberration, chromatic aberration, coma, astigmatism, distortion, and/or field curvature, among others. The correction optic may form part of an objective or may be separate from the objective. In exemplary embodiments, the correction optic is at least one lens of the objective, and may be adjustable via a correction collar of the objective.

Examination region—an area located on the optical axis of an imaging system into which an object, such as a sample and/or a sample holder, is placed for examination (i.e., imaging with an imaging detector). The examination region may be near or at a stage, which is a platform or other support for the object.

Image—an optical counterpart (i.e., an optical image) of an object, formed at a distance from the object and at least partially with light that has interacted with and/or was generated by the object, or a captured representation (i.e., a captured image) of the optical counterpart (and thus the object) created by detecting light of the optical counterpart. In some embodiments, the captured image may be a digital image, which is a numeric representation of the optical image (and object). When used as a verb, "image" means to form an optical image of an object and/or to capture the optical image.

Imaging detector—a sensor device that detects light forming an optical image and creates a captured image (e.g., a digital image) corresponding to the optical image. The coupled processes of light detection and image creation are described herein as image capture. The imaging detector is capable of detecting spatial variations (e.g., variations in intensity) of light across a photosensitive detection area. The imaging detector may be an array detector, such as a charge-coupled device (CCD) sensor, an active pixel sensor (e.g., a complementary metal-oxide-semiconductor (CMOS) sensor), a hybrid CCD-CMOS sensor, or the like. The imaging detector may create a raster image that is a representation of a two-dimensional image, such as a rectangular array of pixels, and may be configured to create color images, grayscale (monochromatic) images, or both. The imaging systems disclosed herein may have a single imaging detector for capturing images of a reference and a sample, or at least a pair of imaging detectors (e.g., one for capturing images of a reference and another for capturing sample images).

Light—optical radiation, including ultraviolet radiation, visible radiation (i.e., visible light), and/or infrared radiation.

Light source—a device that generates light by any suitable mechanism, including electroluminescence, stimulated emission, thermal radiation, and/or photoluminescence, among others. The light source may include a semiconductor device, laser (e.g., solid-state laser, gas laser, excimer laser, dye laser, semiconductor laser, etc.), arc lamp, and/or the like. Exemplary semiconductor light sources include laser diodes, light-emitting diodes (LEDs), and superluminescent diodes, among others.

Object—the material or item(s) being imaged. The object may be a reference, a sample, and/or a sample holder, among others.

Objective—an optical element or set of optical elements that collects light from an examination region of an imaging system. The objective generally constitutes at least the upstream end of the collection optics of an imaging system. The objective, alone or in combination with one or more other optical elements (e.g., a tube lens and/or relay mirror) of the collection optics, is configured to form a conjugate image of an object located in the examination region. Accordingly, the objective may focus or generally collimate light received from the examination region. The objective and the examination region may be movable relative to one another along the optical axis (such as along a z-axis), to change the setting (e.g., z-axis position) of the objective. In some embodiments, the objective may include a plurality of optical elements, such as lenses, contained in a housing. One or more of the objective optical elements may be a correction optic that is movable with respect to another optical element(s) of the objective along the z-axis. In some embodiments (e.g., with epi-illumination), the objective also may transmit light to the examination region.

Optical axis—an imaginary line representing the axis of rotational symmetry of an optical system, as defined by optical elements thereof. The optical axis generally corresponds to the optical path along which light propagates, such as from a light source to an examination region and from the examination region to a detector. An off-axis aperture, as described herein, can radially offset at least a portion of the optical path from the optical axis. The optical axis may be "folded" by reflection, one or more times, which means that the axis changes direction, each time it is folded, by any suitable angle, such as 45, 60, 90, 120, 135, 150, or 180 degrees, among others.

Optics—a set of optical elements of an imaging system, which may be arranged along an optical path between a light source and an examination region (illumination optics) and/or along an optical path between the examination region and an imaging detector (collection optics). An optical element may be any device or structure that interacts with light, such as to collect, direct, focus, and/or collimate light, and/or at least partially block (e.g., filter) light. An optical element may function by any suitable mechanism, such as reflection, refraction, scattering, diffraction, absorption, and/or filtering, among others. Exemplary optical elements include lenses, mirrors, diffusers, gratings, prisms, filters, aperture members, masks, beam-splitters, transmissive fibers (fiber optics), and the like.

Processor—an electronic circuit(s) that performs operations on data. The processor may perform the operations based on a set of instructions. The data and/or instructions may be stored in memory that is external to the processor and/or the data may be provided by a data stream.

Property of an image—a feature, quality, or other measurable characteristic of an image, generally a captured image. Exemplary image properties that correspond to image focus and/or optical aberration include the location, size, shape, contrast, and/or intensity of an optical counterpart of a reference in an image and/or of the whole image. Each property may be described as a quality metric of the image.

Reference—an object having a predefined size, shape, and/or pattern. The reference may be projected onto a surface(s) of a sample holder, and onto an imaging detector by reflection at the surface(s), among others.

The object may be a point source object. The point source object may have a size that is comparable to or smaller than the diffraction limit (the resolving power) of the objective. For example, the point source object may have a diameter that is less than about 2, 1, 0.8, or 0.5 micrometers, among others. Accordingly, the point source object may produce an Airy pattern when imaged (when in focus and with aberration corrected). The point source object may, for example, be integral to a light source (e.g., an integral aperture) and/or may be formed by an aperture that is separate from the light source. In other cases, the object may be a patterned object created by a mask.

Sample—a specimen that is imaged. The sample may have any suitable properties. The sample may be organic and/or inorganic, natural and/or manufactured, and may include any suitable assembly, material, substance, isolate, extract, particles, or the like. In exemplary embodiments, the sample is a biological sample and includes biological cells to be imaged. The biological cells may be eukaryotic or prokaryotic, and may be alive or dead (e.g., fixed). Exemplary biological cells include established cells (cell lines), primary cells, cells of a tissue sample, cells from a clinical sample (e.g., a blood sample, a fluid aspirate, a tissue section, etc.), bacterial cells, or the like. The sample also may include any suitable medium, generally an aqueous medium, which may include water, salts, buffer, glucose, detergent, dye, protein, amino acids, or any combination thereof, among others. The medium may or may not be a growth medium for biological cells.

Sample holder—a device for holding at least one sample or any array of spatially isolated samples. The sample holder may have a horizontal wall including a proximal surface (closer to the objective) and a distal surface (farther from the objective), which may be parallel to one another. The sample may be located on the distal surface, and an optical image of the sample may be formed with light that has passed through the horizontal wall at least once or twice. The horizontal wall may be the bottom wall of a well (e.g., forming the floor of the well), a coverslip, or the like.

The sample holder may include at least one well. The well may have any suitable total capacity for fluid, such as less than about 10, 5, 2, 1, 0.5, 0.2, or 0.1 mL, and/or greater than about 0.025, 0.05, 0.1, 0.2, 0.5, or 1 mL, among others. The inside diameter of the well may be constant or may vary (e.g., may decrease) from the top to the floor of the well. If the inside diameter decreases toward the floor, the diameter may decrease smoothly, stepwise, or a combination thereof. In some embodiments, the inside diameter may decrease linearly, or smoothly but non-linearly. The shape of the well, as defined in horizontal cross-section, may be constant or may vary from the top to the floor of the well. This shape, and/or the perimeter of the floor, may be circular, oval, polygonal (e.g., rectangular, such as square), or the like. The well may be formed of any suitable material, although polymer may be preferred. The floor and/or side walls of the well may be coated with another material, such as collagen, laminin, fibronectin, or the like, to promote cell adhesion.

The well may be provided by a sample holder (e.g., a multi-well plate) having an array of wells. The wells of the sample holder may be attached to one another (e.g., formed integrally with one another, such as by injection molding) to form a multi-well sample holder having a horizontal array of wells with floors and/or bottom walls that are substantially coplanar with one another. The sample holder may have any suitable number of wells, such as at least or exactly 4, 6, 12, 24, 48, 96, or 384 wells, among others. The wells may be arranged in a rectangular array, for example, a 2-by-3 array for a multi-well plate having six wells or an 8-by-12 array for a multi-well plate having 96 wells.

In other embodiments, the sample holder may be an assembly of a slide and a coverslip, a flow chip, or a plate or flask for culturing cells, among others.

Setting—a position, orientation, and/or configuration. Each of a correction optic and an objective can be adjusted to a plurality of different settings to change one or more properties of an image of a reference.

II. SYSTEM OVERVIEW

This section provides an overview of exemplary microscope imaging systems 50, 50' utilizing a reference 52 projected via an off-axis aperture member 54 to an imaging detector 56, to provide feedback from captured images 58 for adjustment of an objective 60 and/or a correction optic 62; see FIGS. 2-5.

Figure 2:
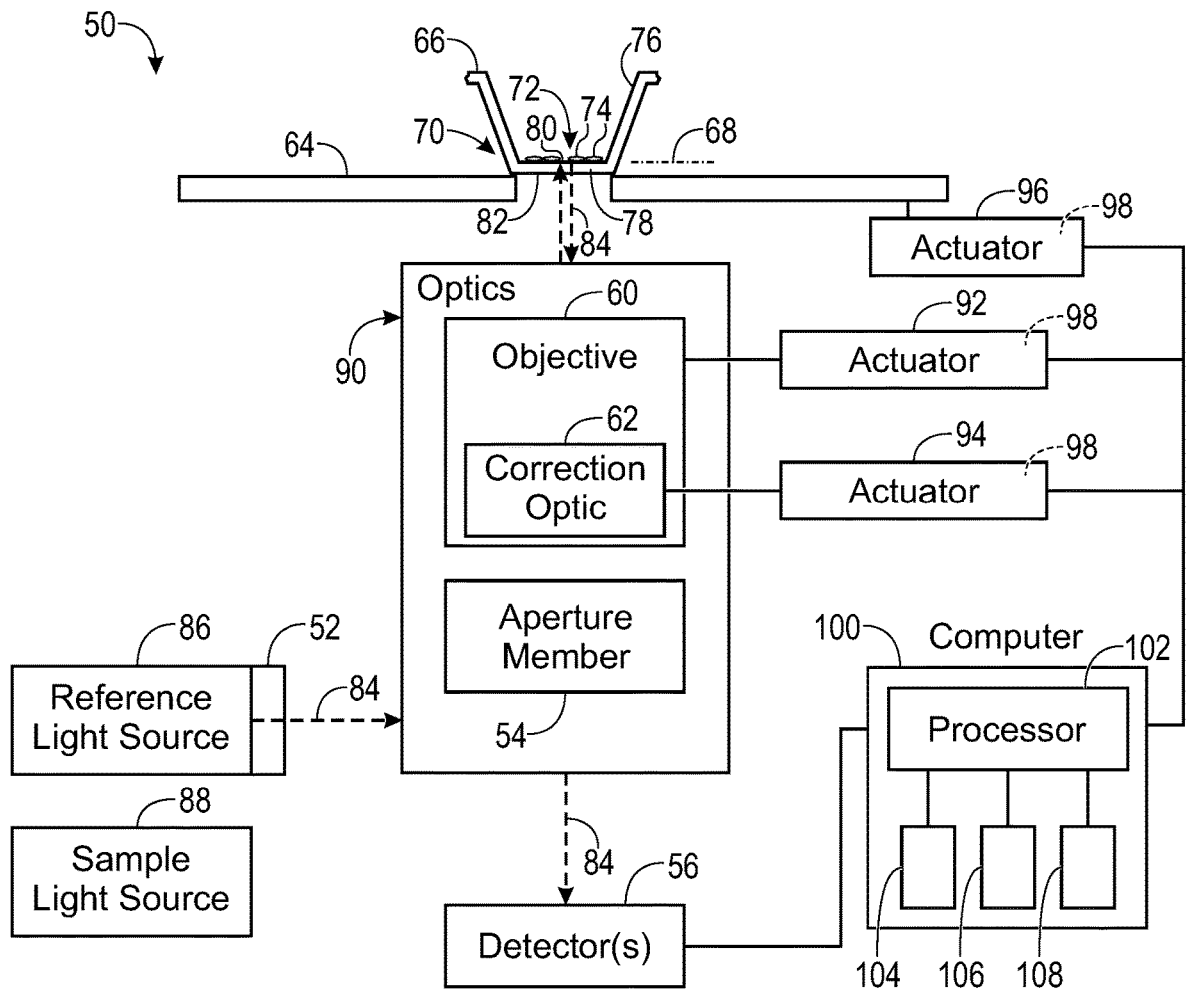
FIG. 2 is a schematic diagram of an exemplary microscope imaging system utilizing a reference and an off-axis aperture for autofocusing with an objective and autocorrection with a correction optic of the objective, in accordance with aspects of the present disclosure.
Figure 3:
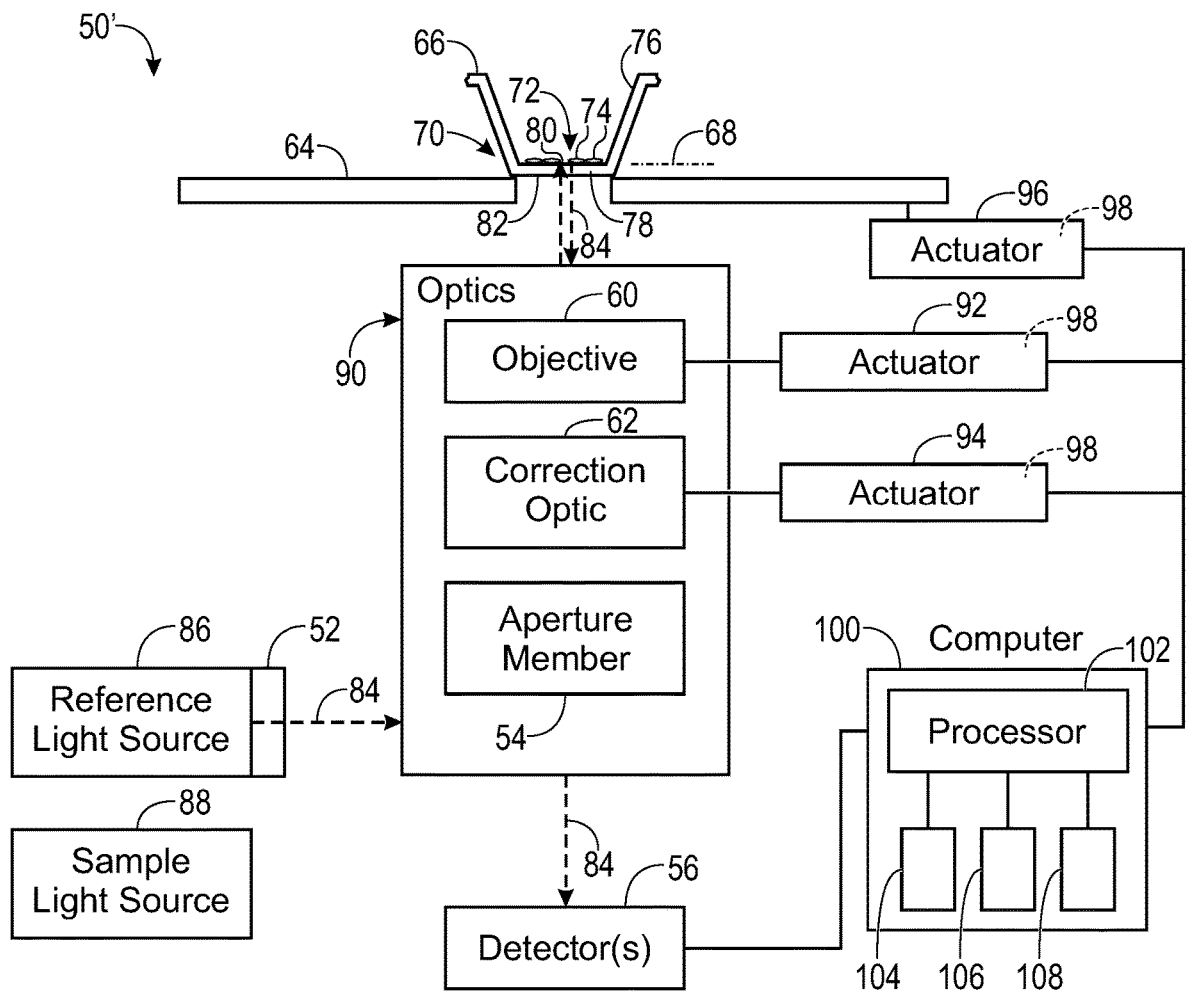
FIG. 3 is a schematic diagram of another exemplary microscope imaging system that is similar to the system of FIG. 2 except that the correction optic is separate from the objective, in accordance with aspects of the present disclosure.

Systems 50 and 50' are similar except that correction optic 62 is integral to objective 60 in system 50 (see FIG. 2) and separate from objective 60 in system 50' (see FIG. 3). The following discussion will refer only to system 50 of FIG. 2 but is equally pertinent to system 50' of FIG. 3.

System 50 includes a stage 64 to support a sample holder 66 at a focal plane 68 of objective 60 in an examination region 70 associated with stage 64. Sample holder 66 may contain at least one sample 72, such as biological cells 74 shown here. The sample may be contained by a sample-holding compartment, such as a compartment defined by a well 76, or the space between a slide and a coverslip, among others. However, in some embodiments, the sample holder may not hold a sample on the optical axis (and/or may contain no sample(s)) when used in focusing or correction procedures.

Sample holder 66 provides a wall 78 disposed between sample 72 (or the sample-holding compartment) and objective 60. Wall 78 has a distal surface 80 and a proximal surface 82 that are respectively farther from, and closer to, objective 60 along an optical axis extending from the objective. Surfaces 80, 82 may be parallel to one another and separated by less than one millimeter, such as less than about 500, 300, or 200 micrometers, among others. Distal surface 80 may reflect light 84 (indicated by dashed arrows) during adjustment of objective 60 and/or correction optic 62 to provide focusing and/or optical correction, as described in more detail below.

System 50 has one or more light sources, such as a reference light source 86 and at least one sample light source 88, to generate light (such as light 84). Reference light source 86 is energized in the depicted state of system 50 and illuminates reference 52 during focusing and/or correction procedures. Sample light source 88 may be energized (and reference light source may be shut off), to produce light for epi-illumination or trans-illumination of sample 72 when system 50 is in a sample imaging state. In some embodiments, the same light source may be used for focusing/correction and sample imaging (e.g., by scanning the sample with a beam of light from the reference light source).

Light is propagated from each light source 86, 88 to sample holder 66 and/or sample 72, and from the sample holder and/or sample to an imaging detector 56 via optics 90. The optics include a set of optical elements that direct and influence this propagation, although different subsets of the optical elements may be operative for illumination of examination region 70 and collection of light from examination region 70. Moreover, different subsets of the optical elements may be utilized for illumination of examination region 70 with respective light sources 86, 88. For example, one or more of the optical elements may be dedicated to each light source. Furthermore, different subsets of the optical elements may be used for collection of light from examination region 70 when each light source is operative, such that the collected light is incident on a different imaging detector corresponding to each light source. For example, the system may have a reference imaging detector that is dedicated to capturing images of a projected reference, and a sample imaging detector dedicated to sample imaging.

Optics 90 include objective 60, correction optic 62, and off-axis aperture member 54. Objective 60 and correction optic 62 may be located on the collection path from examination region 70 to the same or different imaging detectors 56 when each respective light source 86, 88 is operative. The objective and correction optic also may be operatively positioned on the illumination path from each light source 86, 88 to examination region 70 if the examination region is being epi-illuminated. In contrast, off-axis aperture member 54 is generally used to restrict passage of light only from reference light source 86. In other words, off-axis aperture member 54 may be disposed upstream on an illumination path from reference light source 86 (but not from sample light source 88), or may be disposed downstream on a collection path to a reference imaging detector (but not a dedicated sample imaging detector) of the system. Accordingly, if aperture member 54 is positioned downstream of the objective, and the same imaging detector is used for reference and sample imaging, the aperture member may need be removed from the optical path after focusing/correction with the reference and before sample imaging is performed. In some embodiments, a pair of off-axis aperture members 54 may be utilized when reference light source 86 is energized, for example, aperture members 54 that are respectively upstream and downstream of objective 60. However, the presence of more than one off-axis aperture member 54 generally requires alignment of the corresponding apertures with one another, to permit light to pass through both apertures.

The positions and/or configurations of objective 60, correction optic 62, and stage 64 may be adjusted via respective actuators 92, 94, and 96. Each actuator may be driven by a motor 98 and/or operated automatically under the control of a computer 100, and particularly a processor 102 thereof, as in the depicted embodiment. Computer 100 (and/or processor 102) may be connected (via a wired or wireless connection) to any suitable combination of the devices of imaging system 50, such as each imaging detector 56, each light source 86, 88, and/or each actuator 92, 94, and 96, among others. In some embodiments, at least one of the actuators, such as actuator 94 for correction optic 62, may be operated manually by the user based on adjustment instructions communicated via computer 100.

Actuators 92, 94, and 96 may have any suitable roles in system 50. Objective actuator 92 may operate to adjust a setting of objective 60 to provide focusing by changing the z-positions of objective 60 and stage 64 relative to one another and/or by changing the configuration of the objective. For example, objective actuator 92 may drive movement of the objective along a z-axis relative to stage 64 (and/or stage 64 may be driven along a z-axis relative to objective 60). Correction actuator 94 may operate to change a setting of correction optic 62, such as by moving the correction optic along the optical axis (e.g., along a z-axis) with respective to at least one optical element of objective 60. Stage actuator 96 may drive movement of stage 64 in an xy-plane, such as to image samples in different wells of the sample holder and/or to scan a sample that is larger than the field of view of the objective. The stage actuator also or alternatively may be capable of driving movement of stage 64 along a z-axis.

Computer 100 may have any suitable hardware to facilitate communication with, and/or operation of, processor 102. Exemplary hardware includes memory 104 storing instructions for processor 102 to perform any suitable procedures, such as image processing to determine values for one or more image properties, comparison of these values to one another and/or to one or more thresholds, calculation of settings for optics (e.g., the objective and/or correction optic), generation of control signals for actuators to change these settings, communication with a user via one or more user interfaces, and/or the like. Memory 104 also may store data related to the system, such as storage of the image coordinates that define an in-focus region for the reference (see below). Exemplary user interfaces that may be suitable include an input device 106 (e.g., a keyboard, keypad, mouse, touchscreen, etc.) and an output device 108 (e.g., a monitor, printer, touchscreen, etc.). In some embodiments (e.g., with a touchscreen), the same device may handle input from the user and output from the processor.

Figure 4:
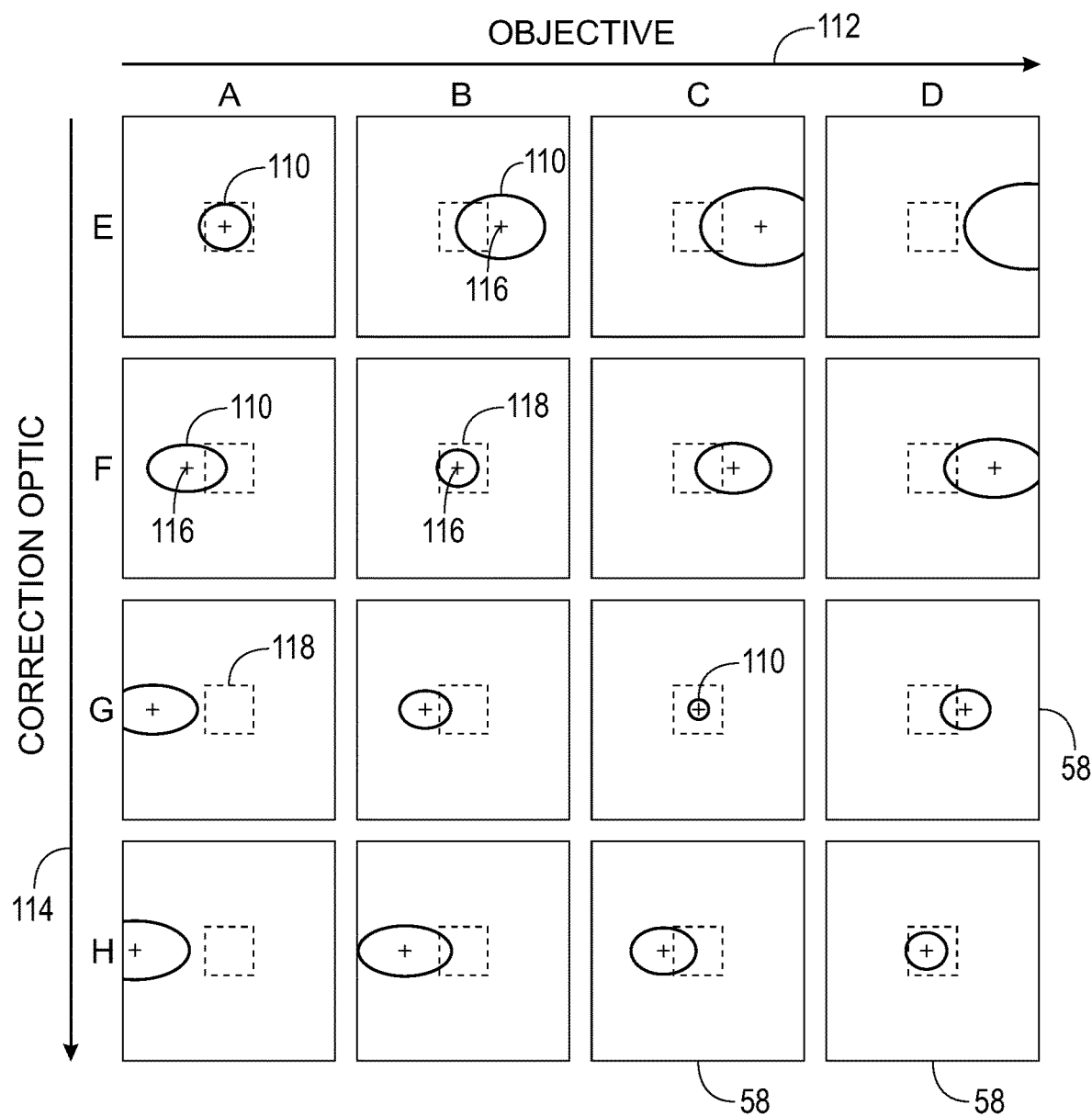
FIG. 4 is a stylized representation of a set of images of a reference that may be captured with the microscope imaging system of FIG. 2 at a series of different settings of the objective (shown along the horizontal axis in FIG. 4) and the correction optic (shown along the vertical axis in FIG. 4), in accordance with aspects of the present disclosure.

FIG. 4 shows a stylized representation of a set of captured images 58 of reference 52 that may be collected with microscope imaging system 50 when the reference is a point source object (also see FIG. 2). More precisely, each image 58 of reference 52 records an optical counterpart 110 of reference 52 formed on the photosensitive area of imaging detector 56. Captured images 58 are obtained at a series of different settings of objective 60, indicated at A, B, C, and D along a horizontal axis 112, and at a series of different settings of correction optic 62, indicated at E, F, G, and H along a vertical axis 114. Each axis 112, 114 represents a continuous range of settings for objective 60 or correction optic 62, although the objective and/or correction optic may or may not be continuously adjustable.

Additional image features are shown. A centroid 116 of each optical counterpart 110 is marked with a cross. The centroid represents the center of "mass" of the optical counterpart, where the mass is the total intensity of the optical counterpart in the image plane. A focus region 118 in which centroid 116 is located when optical counterpart 110 is substantially in focus is marked with a dashed box, and may be defined by x and y image coordinates within the captured images. The image coordinates may be stored in memory 104 of computer 100 and may be accessible to processor 102. The position within captured images 58 of focus region 118 may be predetermined by the manufacturer or the user. In the present illustration, for convenience, focus region 118 is located centrally in the captured images, but alternatively may have any other suitable position within the captured images.

The use of off-axis aperture member 54 in imaging system 50 or 50' may produce characteristic changes in various properties of optical counterpart 110 during adjustment of objective 60 and correction optic 62. These properties may include (a) the location of centroid 116 with respect to focus region 118 within captured images 58, (b) the shape of optical counterpart 110 (e.g., its morphology), (c) the size of optical counterpart 110, (d) the intensity of optical counterpart 110 (e.g., its maximum intensity), and/or (e) the contrast of each captured image 58. Exemplary changes for these properties are shown in FIG. 4.

The change in location of centroid 116 as optical counterpart 110 is focused and defocused can streamline the search for a suitable combination of objective setting (e.g., one of A-D) and correction setting (e.g., one of E-H). When optical counterpart 110 is defocused, centroid 116 is outside of focus region 118 (e.g., see setting combinations AH and DE). The distance of centroid 116 from focus region 118 generally indicates the degree of defocus (e.g., compare setting combinations AG, BG, and CG). The direction in which centroid 116 is spaced from focus region 118 (e.g., left or right as depicted here) generally indicates the direction in which one or both settings need to be changed (e.g., compare BG and DG).

Other properties of optical counterpart 110 and/or the corresponding image 58 also may generally correlate with the location of optical counterpart 110. For example, in the present illustration, optical counterpart 110 is substantially circular when centroid 116 is located in focus region 118, and becomes increasingly elongated according to the degree of defocus (e.g., compare setting combinations BF, CF, and DF). The size of the optical counterpart also may be directly related to the degree of defocus (e.g., compare setting combinations AE, BE, CD, and DE), and thus the maximum intensity of optical counterpart 110 may be inversely related to the degree of defocus.

The goal is generally to find the best combination of settings for the objective and correction collar efficiently. The off-axis aperture incorporated into the systems and methods of the present disclosure can reduce the number of combinations that need to be generated and compared by decoupling the degree of focus/defocus, as indicated by the location and/or shape of the optical counterpart, from the degree of correction/de-correction. For example, in the present illustration, the optical counterpart produced with setting combinations AE, BF, CG, and DH is substantially in focus, but is corrected with the correction optic best in CG, since the size of optical counterpart 110 is smaller, and its intensity is greater, with combination CG.

Figure 5:
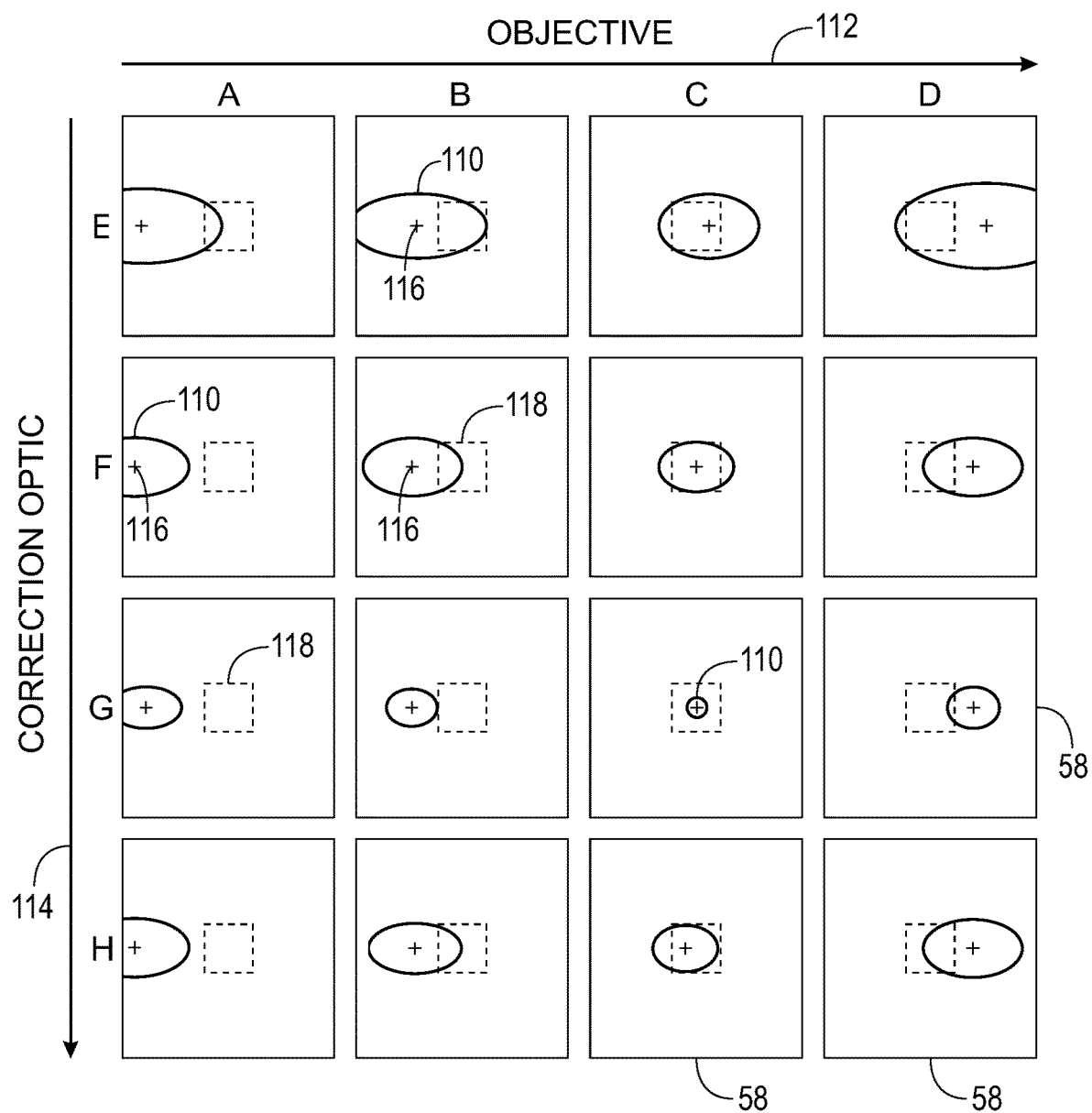
FIG. 5 is a stylized representation of a set of images of a reference that may be captured with the microscope imaging system of FIG. 3 at a series of different settings of the objective (shown along the horizontal axis in FIG. 5) and the correction optic (shown along the vertical axis in FIG. 5), in accordance with aspects of the present disclosure.
Figure 6:
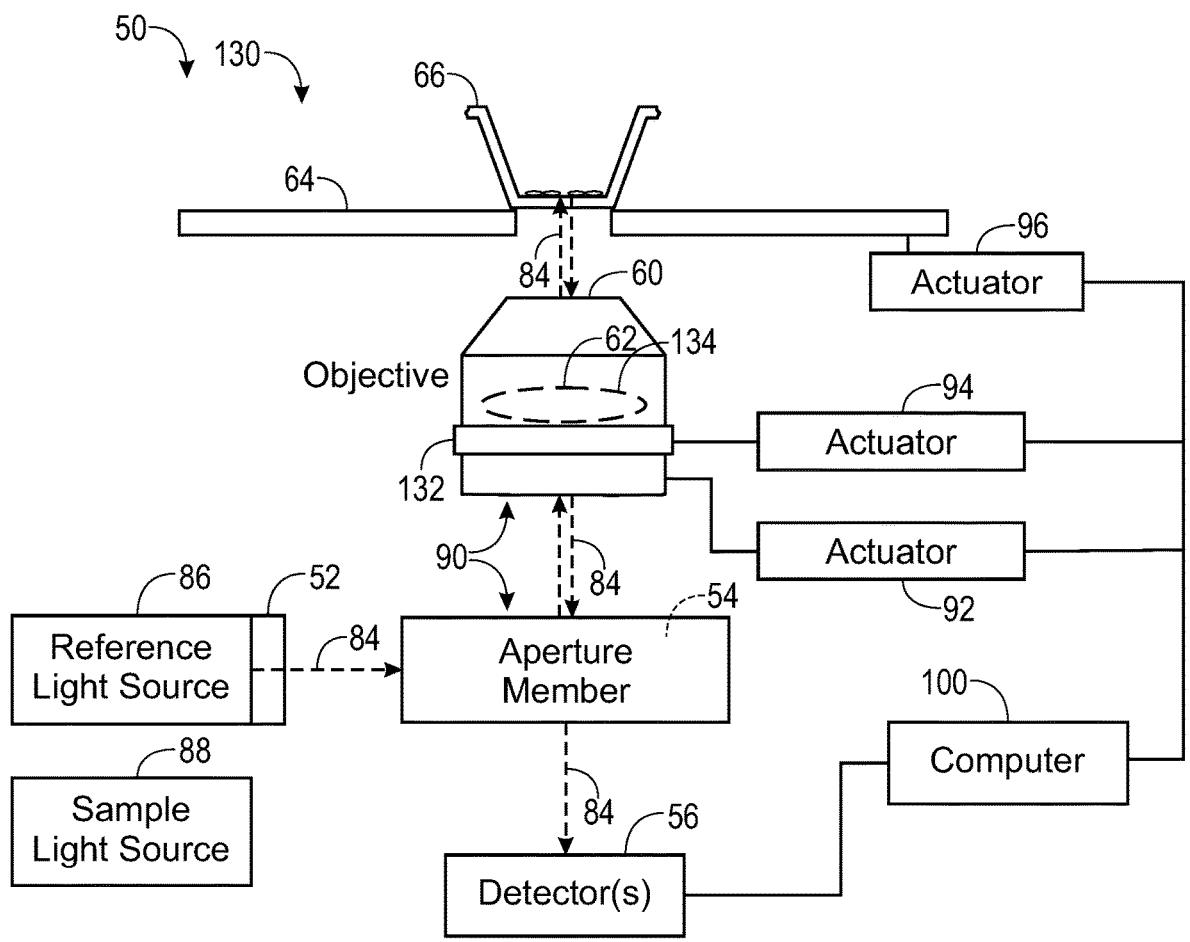
FIG. 6 is a schematic diagram of an embodiment of the microscope imaging system of FIG. 2 in which the correction optic is a lens or lens group of the objective and is adjustable with a correction collar, in accordance with aspects of the present disclosure.

FIG. 5 shows a stylized representation of a set of captured images 58 of an optical counterpart 110 of reference 52 that may be collected with microscope imaging system 50' (see FIG. 3) when the reference is a point source object. In imaging system 50', correction optic 62 is separate from objective 60. Accordingly, adjustment of the correction optic may have a significantly smaller effect on the position of the front focal plane of objective 60 than in imaging system 50

(compare FIGS. 2 and 3). As a result, objective 60 may be adjusted to a final setting before any adjustment of correction optic 62. For example, starting from any of settings E-H for correction optic 62, objective 60 may be adjusted to the setting of column C, which places centroid 116 in focus region 118. Correction optic 62 then may be adjusted to find the best image definition (image CG in this example), without substantially changing the position of centroid 116.

Further aspects of imaging systems 50 and 50' that may be suitable are described elsewhere in the present disclosure, such as in Sections I, III, and IV.

III. IMAGING METHODS

This section describes exemplary methods of imaging a reference and/or sample. The steps described in this section may be performed in any suitable order and combination using any of the systems of the present disclosure.

A reference may be projected onto an imaging detector. The reference may be a point source object or a patterned object, among others. To project the reference, light may propagate, upstream to downstream, from a light source, through the reference, through an objective, and through a wall of a sample holder to a distal surface of the wall. The distal surface is very close to, and thus corresponds to, the object plane for a sample. The light is reflected from the distal surface, back through the wall and the objective, to a detection area of an imaging detector. The light passes through an off-axis aperture downstream of the reference and upstream of the imaging detector.

Images of the projected reference may be captured using the imaging detector. Each captured image may represent a different setting of the objective and/or correction optic, and thus a different combination of the settings. The images may be processed with a processor to obtain values for one or more properties of the images, such as the location, shape, size, intensity, and/or contrast of the projected reference. In some embodiments, values for two or more properties may be combined to produce a value that is a score for the two or more properties collectively.

A setting for the objective and/or correction optic may be selected based on the images captured, and particularly based on values for one or more image properties obtained by processing the captured images. For example, a score for two or more properties of the images may be compared to select the setting. In some embodiments, the objective may be adjusted before the correction optic, to achieve focus (e.g., a rough or approximate focus) based on a first subset of the captured images. Then, the correction optic may be adjusted, optionally with further adjustment of the objective, to optimize the definition of captured images, based on a second subset of the images captured subsequent to the first subset. A measure of image definition may be provided by the contrast and/or intensity of the captured images.

A sample may be imaged while the objective and/or correction optic has the selected setting or selected combination of settings. The sample may be located on the same distal surface of the (first) sample holder, on a different but corresponding distal surface of the same (first) sample holder (e.g., the floor of a different well of the first sample holder), or on a corresponding distal surface of a second sample holder that is substantially identical to the first sample holder. The sample may be illuminated with a different light source from that used for projecting the reference and images captured with the same imaging detector or a different imaging detector.

IV. EXAMPLES

The following examples describe selected aspects and embodiments of imaging systems and methods utilizing feedback from images of a projected reference to guide adjustment of optics before sample imaging. These aspects and embodiments are intended for illustration and should not limit the entire scope of the present disclosure.

Example 1. Microscope System with Automated Correction Collar Adjustment

This example describes an exemplary embodiment 130 of microscope imaging system 50 including an objective 60 having a correction optic 62 coupled to a correction collar 132 of the objective. Correction collar 132 may be configured to be adjusted automatically (or manually) to reduce image aberration, such as spherical aberration; see FIGS. 6-12.

Imaging system 130 may have any suitable combination of the elements, components, and features described above for system 50. Components that have already been described above for FIG. 2 are identified by the same reference numbers in FIG. 6.

Correction actuator 94 includes correction collar 132, which is part of objective 60. Rotation of correction collar 132 in either rotational direction by correction actuator 94 drives corresponding motion of a lens or group of lenses 134 of objective 60 in opposite axial directions, wherein the lens or lens group 134 constitutes correction optic 62.

Figure 7:
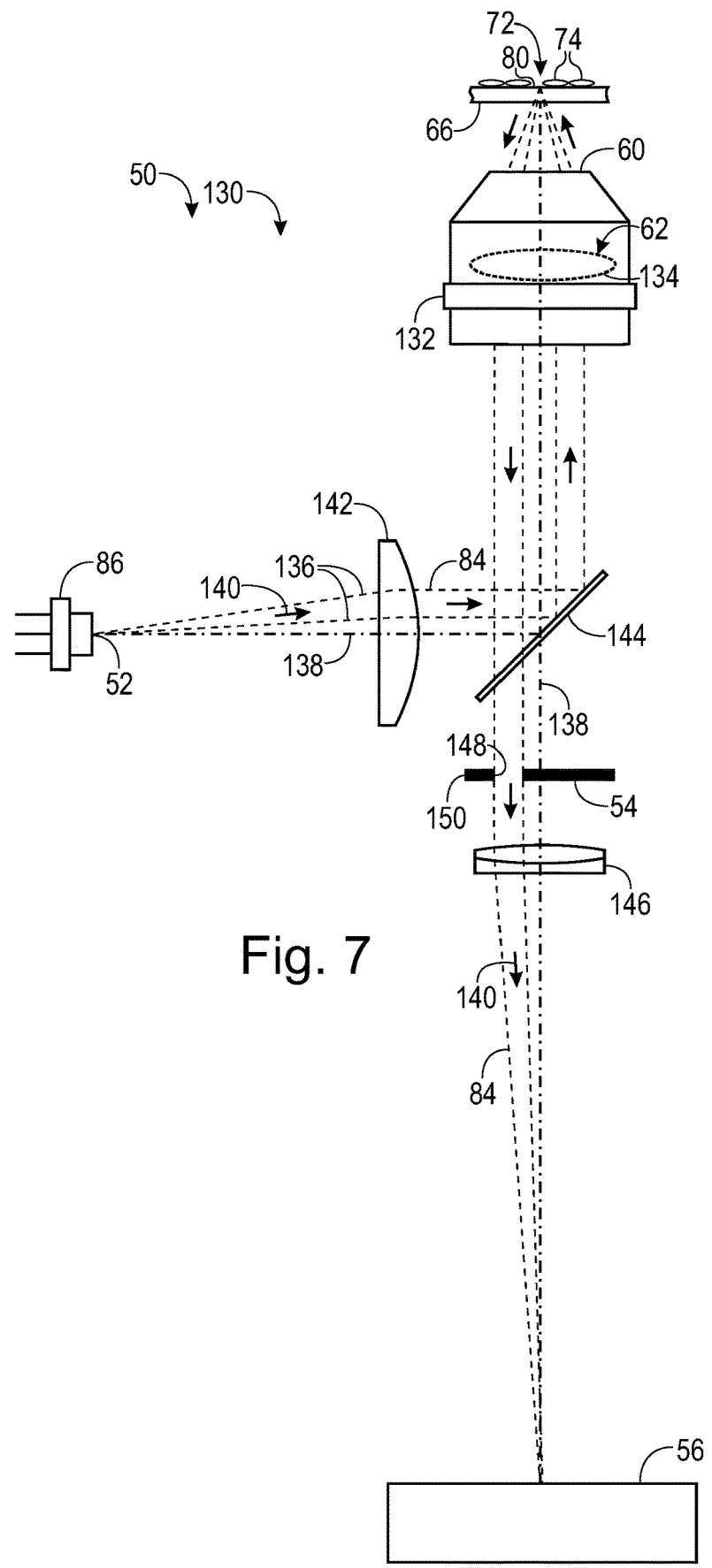
FIG. 7 is a view of an exemplary optical layout for the microscope imaging system of FIG. 6 and showing the optical axis and optical path along which light propagates from a reference light source to a distal surface of a sample holder, and from the distal surface to an imaging detector, wherein the light passes through an off-axis aperture downstream of the objective before reaching the imaging detector, in accordance with aspects of the present disclosure.

FIG. 7 shows an exemplary optical layout for microscope imaging system 130. Light 84, as depicted with a pair of representative light rays 136, propagates generally along a folded optical axis 138 between reference light source 86 and imaging detector 56. An optical path 140 followed by light rays 136 is identified with a series of arrows.

Light 84 propagates from reference 52 of reference light source 86 along a first leg of optical path 140. The light is collimated by a collimation lens 142 to form a parallel light beam, reflected by a beam-splitter 144, and focused by an infinity-corrected embodiment of objective 60 onto distal surface 80 of sample holder 66. Reference 52 is thus projected to form an intermediate image of reference 52 on distal surface 80 by the first leg of optical path 140.

Light 84 is reflected by distal surface 80 and propagates along a second leg of optical path 140 between distal surface 80 and imaging detector 56. The light is collected and generally collimated by infinity-corrected objective 60 to form a parallel light beam, and passes through beam-splitter 144 and aperture member 54. A tube lens 146 focuses the light onto imaging detector 56. Aperture member 54 permits light rays 136 to pass through an aperture 148 of the aperture member. However, an opaque region 150 of the aperture member narrows and laterally offsets the light beam emerging from aperture 148 by blocking light rays that are not aligned with aperture 148. As a result, a final section of optical path 140 extending to imaging detector 56 is skewed with respect to optical axis 138, which may produce the properties of optical counterpart 110 described above in Section II with respect to FIGS. 4 and/or 5.

Figure 8:
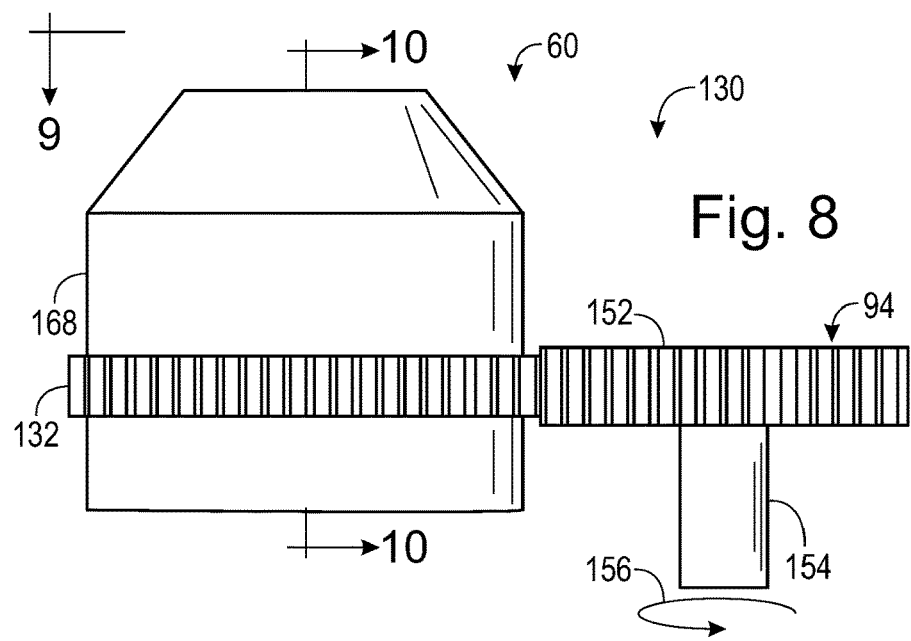
FIG. 8 is a side view of the objective of the microscope imaging system of FIG. 7 and selected aspects of an exemplary actuator of the system for automatically adjusting the correction optic, in accordance with aspects of the present disclosure.
Figure 9:
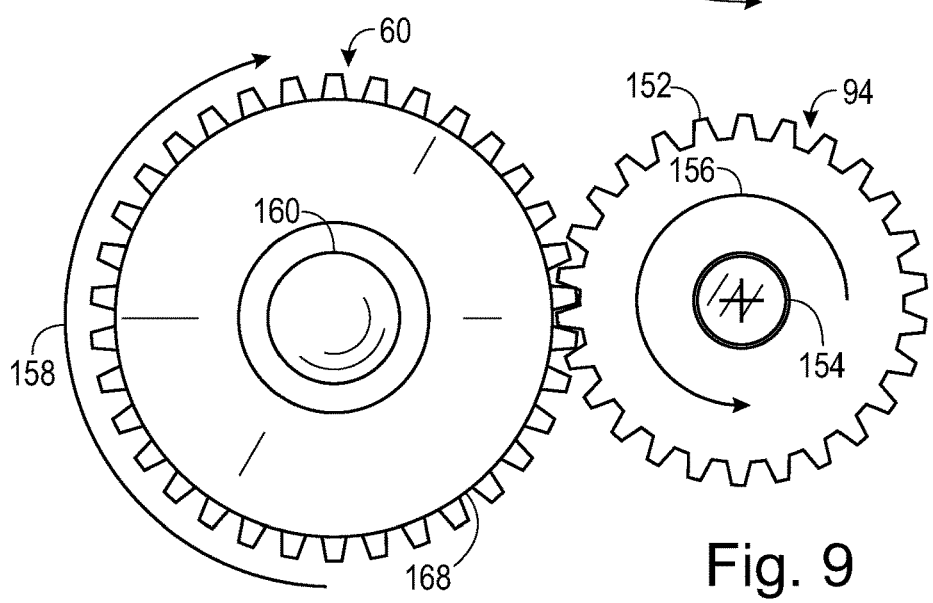
FIG. 9 is a top view of the objective and actuator of FIG. 8, taken generally along line 9-9 of FIG. 8.

FIGS. 8 and 9 show selected aspects of an exemplary coupling between correction actuator 94 and lens(es) 134 of correction optic 62. Correction actuator 94 may include a gear 152 secured to a coaxial shaft 154. The shaft may be driven rotationally, indicated by a rotation arrow at 156, by a motor (e.g., a servomotor) of correction actuator 94. Gear 152 meshes with correction collar 132, such that rotation of gear 152 drives rotation, indicated at 158, of correction collar 132.

Figure 10:
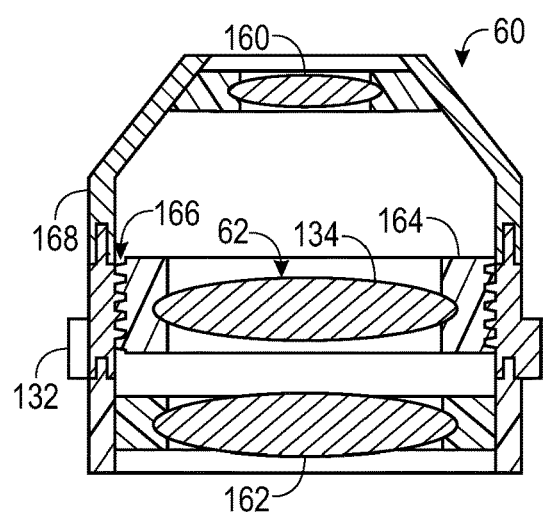
FIG. 10 is a sectional view of the objective and actuator of FIG. 8, taken generally along line 10-10 of FIG. 8.

FIG. 10 illustrates how rotation of correction collar 132 may drive axial movement of correction lens(es) 134 relative to fixed proximal and distal lenses 160, 162 of objective 60. Correction lens 134 may be mounted to a frame 164 having a threaded connection 166 to a housing 168 of objective 60. Rotation of correction collar 132 drives threaded travel of frame 164 (and lens 134) upward or downward inside housing 168 according to the direction of rotation.

Figure 11:
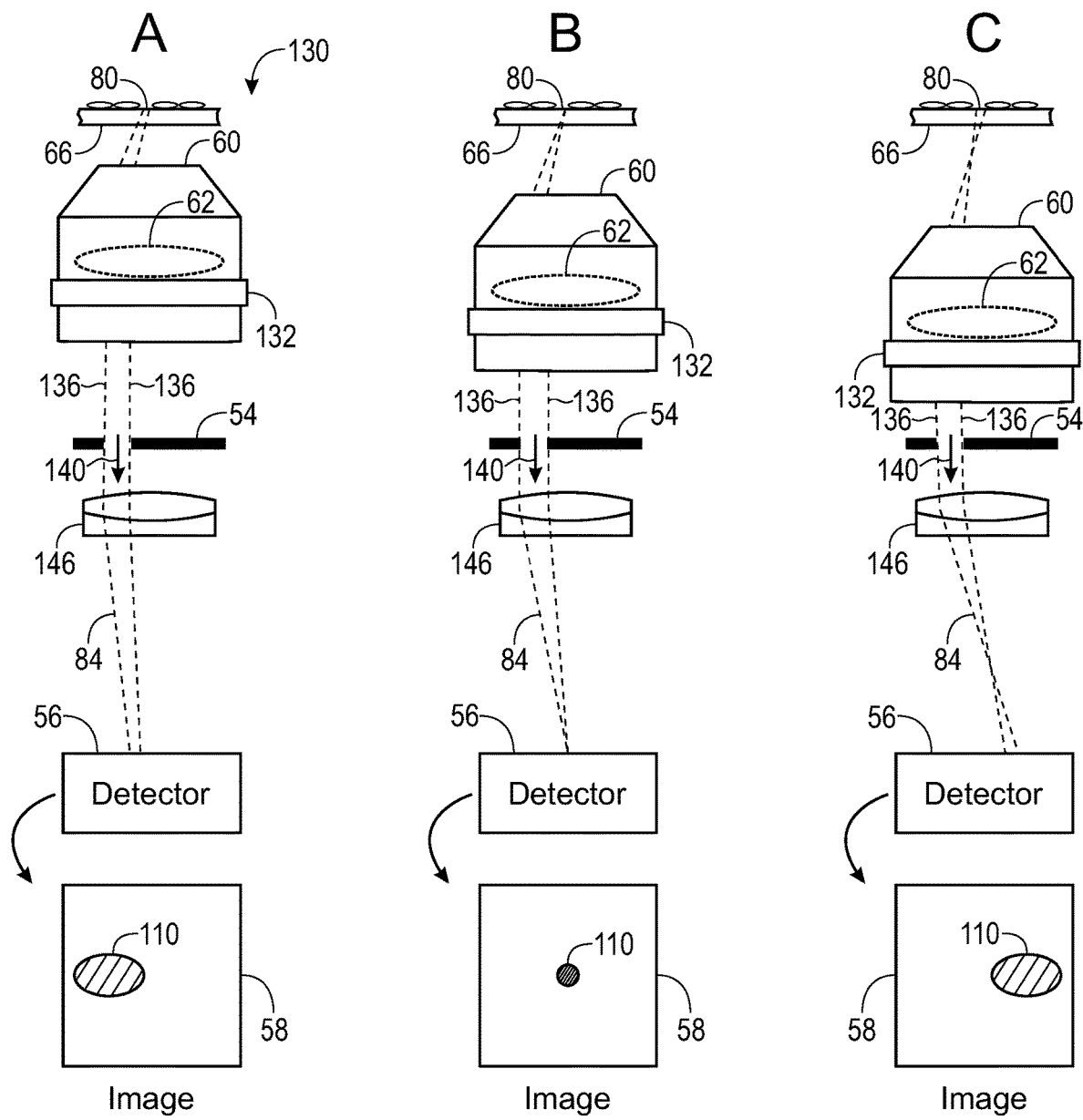
FIG. 11 is a simplified, stylized view of selected aspects of the optical layout of the microscope imaging system of FIG. 7, taken while the reference is being projected onto the imaging detector by propagation through a wall of a sample holder, and illustrating in panels A, B, and C how different settings of the objective may affect the location, size, shape, and/or intensity of the optical counterpart of the reference at the imaging detector.

FIG. 11 presents a simplified, stylized version of the second leg of optical path 140 of imaging system 130, with objective 60 at three different settings in panels A-C. The three panels illustrate how adjusting objective 60 may focus and defocus optical counterpart 110 of reference 52 in images 58 captured by imaging detector 56 (also see FIGS. 4 and 7). The location, size, shape, and intensity of optical counterpart 110 in images 58 changes between panels A and B and between panels B and C. In panel B, optical counterpart 110 is in focus. The front focal plane of objective 60 is substantially coplanar with distal surface 80 of sample holder 66, and optical counterpart 110 is a small, high-intensity spot centered in image 58. In panels A and C, optical counterpart is defocused. The front focal plane of objective 60 is either above (panel A) or below (panel C) distal surface 80 of sample holder 66, and optical counterpart 110 is larger, more elongated, and of lower intensity than in panel B. The location of optical counterpart 110 is shifted to the left (panel A) or to the right (panel C) of its location in panel B.

Figure 12:
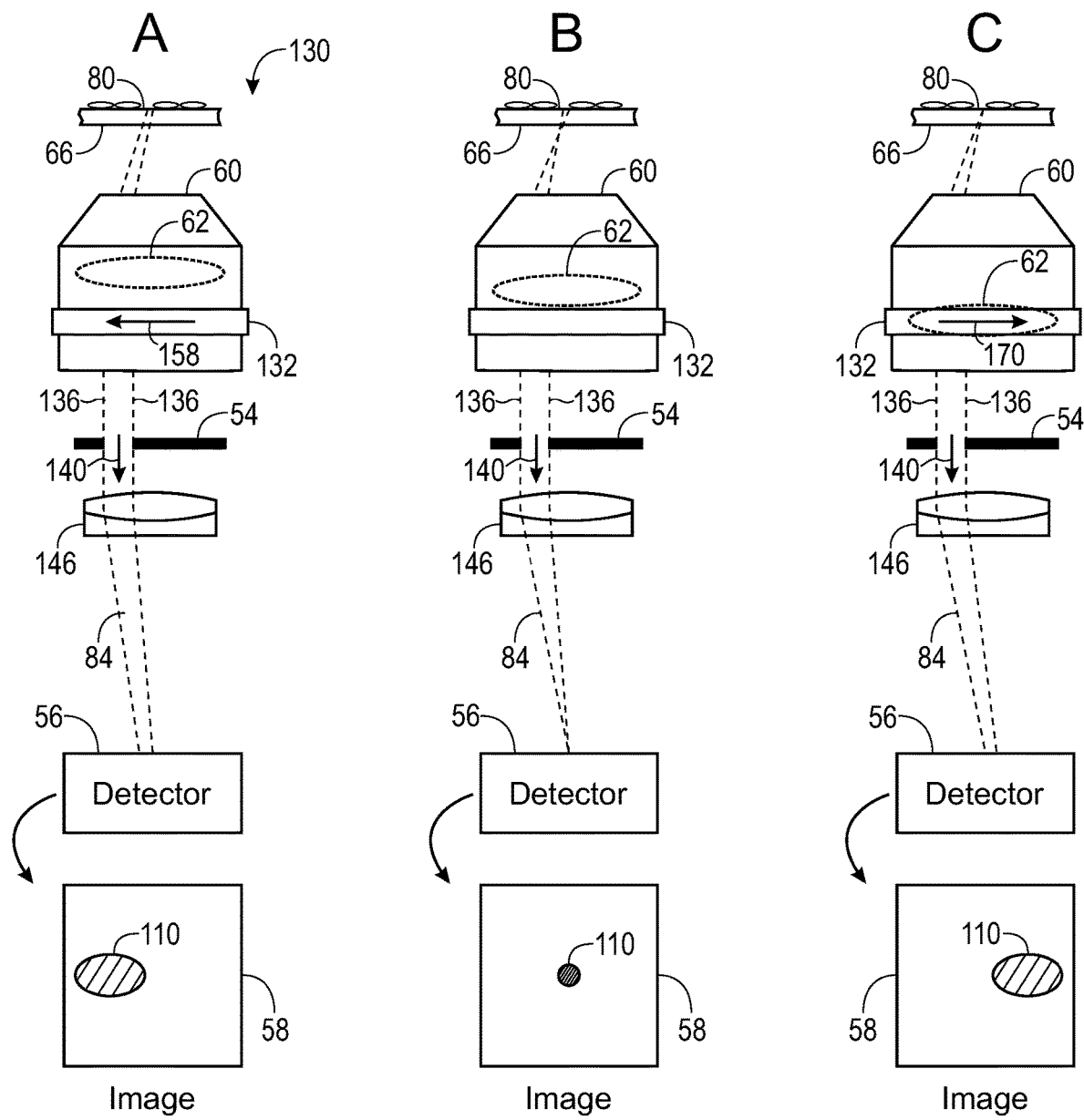
FIG. 12 is a simplified, stylized view of selected aspects of the optical layout of the microscope imaging system of FIG. 7, taken as in FIG. 11, except illustrating in panels A, B, and C how different settings of the correction optic produced by turning the correction collar may affect the location, size, shape, and/or intensity of the optical counterpart of the reference at the imaging detector.

FIG. 12 is similar to FIG. 11 except that correction optic 62, instead of objective 60, is at three different settings in panels A-C. Correction optic 62 may be adjusted by turning correction collar 132 in either rotational direction 158 or 170. Adjusting correction optic 62 also can change the position of the front plane of objective 60, in a manner similar to that described above for FIG. 11 (compare panels A-C of FIG. 11 with panels A-C of FIG. 12). Accordingly, imaging system 130 may need to adjust both objective 60 and correction optic 62 to find the best combination of settings for a given sample holder.

Example 2. Imaging System with Upstream, Off-Axis Aperture

Figure 13:
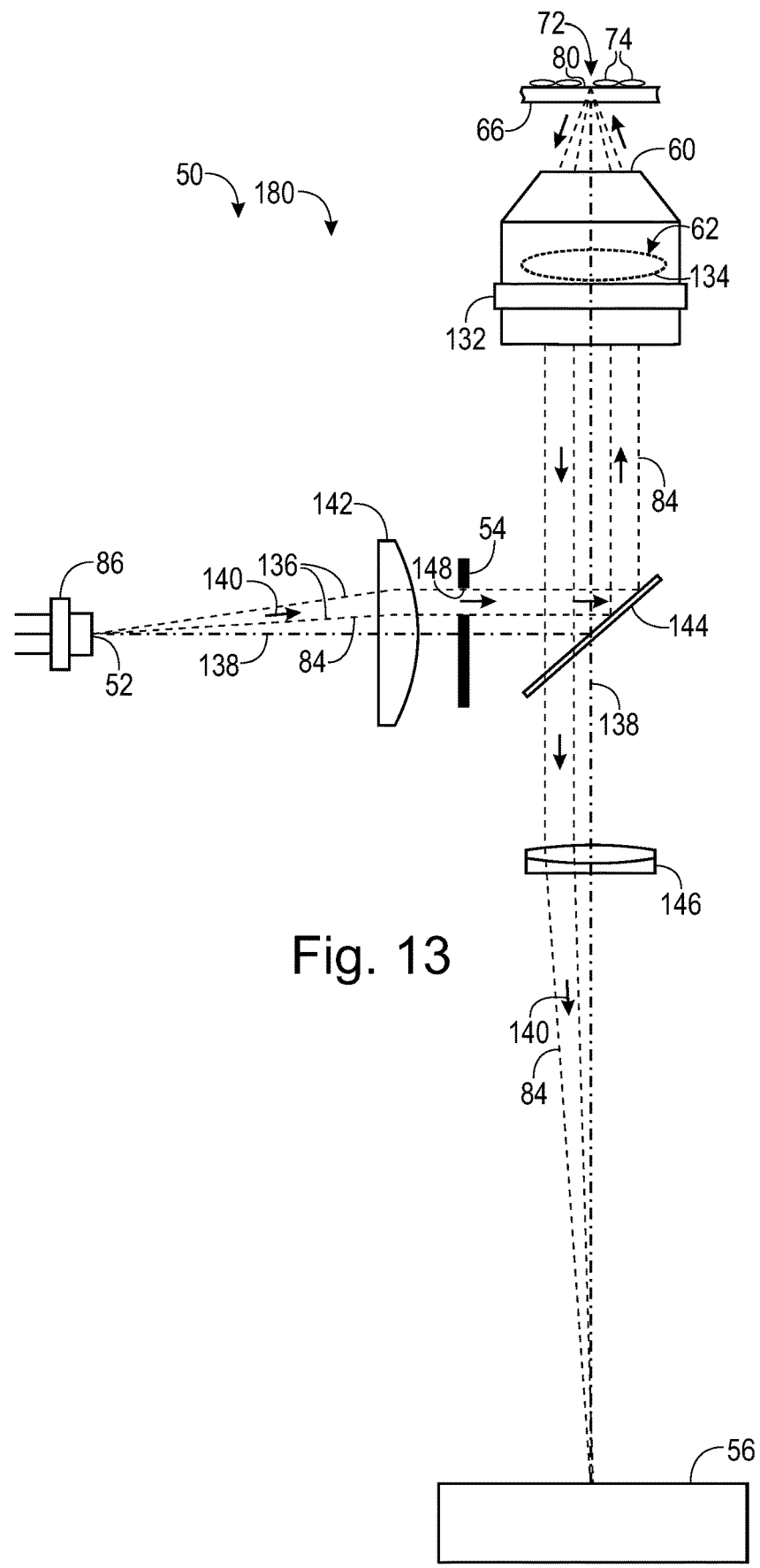
FIG. 13 is a view of another exemplary optical layout for the microscope imaging system of FIG. 6, where the optical layout is similar to that of FIG. 7, except the light passes through an off-axis aperture upstream of the objective, in accordance with aspects of the present disclosure.

This example describes an exemplary imaging system 180 including an off-axis aperture 148 located upstream of objective 60 in optical path 140; see FIG. 13.

Imaging system 180 is similar to imaging system 130 (compare FIGS. 7 and 13), except that aperture member 54 has a different position along optical axis 138. More specifically, aperture member 54 is located downstream of collimating lens 142 and upstream of beam-splitter 144. The aperture member thus narrows a parallel light beam and shifts it off-axis with respect to optical axis 138 in both systems, either upstream of objective 60 (imaging system 180) or downstream of objective 60 (imaging system 130).

Example 3. Microscope Imaging System with Patterned Reference

This example describes an exemplary microscope imaging system 200 including a mask 202 forming a patterned reference 52; see FIGS. 14 and 15.

FIG. 14 shows an optical layout for imaging system 200. Imaging system 200 is similar that of imaging system 180 (see FIG. 13), except that a point source reference 52 (system 180) is replaced with a patterned reference 52 in the form of mask 202 (system 200). Mask 202 may be projected onto imaging detector 56 using light 84 generated by reference light source 86, which may or may not be a point source (e.g., the light source may be a light-emitting diode). Mask 202 may be illuminated with a collimated beam 204 produced with a collimating lens 206 located on optical axis 138 upstream of the mask. The location of the centroid of the optical counterpart of mask 202 in images captured with imaging detector 56 changes according to the degree of defocus, as described above for a point source reference. The contrast of the captured images may be optimized, while maintaining the centroid in the focus region of the images, to find the best focus and image correction.

FIG. 15 shows mask 202 viewed along the optical axis. The mask may have a plurality of light-transmissive sectors 208 arranged radially and separated from one another by light-blocking sectors. However, any suitable regular or irregular arrangement of light-transmissive areas may provide sufficient contrast.

Example 4. Selected Embodiments

This example describes selected embodiments of the present disclosure as a series of indexed paragraphs.

Paragraph 1. A method of imaging, the method comprising: (a) projecting a reference onto an imaging detector by propagation of light generally along an optical axis extending from the reference, through an objective, to a surface of a sample holder, and from the surface, back through the objective, to the imaging detector, wherein the light propagates through an off-axis aperture located upstream of the imaging detector and spaced from the optical axis; (b) capturing a plurality of images of the reference using the imaging detector, and with a correction optic at two or more different settings; (c) selecting a setting for the correction optic based on the plurality of images; and (d) imaging a sample while the correction optic has the selected setting.

Paragraph 2. The method of paragraph 1, wherein the reference is a point source object.

Paragraph 3. The method of paragraph 1 or 2, wherein light for the step of projecting is produced by a laser diode, and wherein the reference is integral to the laser diode.

Paragraph 4. The method of any of paragraphs 1 to 3, wherein the reference is a patterned object formed by a mask.

Paragraph 5. The method of paragraph 4, wherein the step of projecting includes collimating light upstream of the mask, and passing a portion of the collimated light through the mask.

Paragraph 6. The method of any of paragraphs 1 to 5, wherein the aperture is located upstream of the imaging detector and downstream of the reference.

Paragraph 7. The method of paragraph 6, wherein the optical axis has a first leg extending from the reference to the surface of the sample holder, and wherein the aperture is located upstream of the objective and radially offset from the first leg of the optical axis.

Paragraph 8. The method of paragraph 6, wherein the optical axis has a second leg extending from the surface of the sample holder to the imaging detector, and wherein the aperture is located downstream of the objective and radially offset from the second section of the optical axis.

Paragraph 9. The method of any of paragraphs 1 to 8, wherein the step of projecting forms an optical counterpart of the reference on the imaging detector.

Paragraph 10. The method of paragraph 9, wherein the optical counterpart has a location on the imaging detector that changes if the objective and the sample holder are moved relative to one another along a z-axis.

Paragraph 11. The method of paragraph 9 or 10, wherein the optical counterpart has a location on the imaging detector that changes if the correction optic and the sample holder are moved relative to one another along a z-axis without moving the objective as a unit.

Paragraph 12. The method of any of paragraphs 1 to 11, wherein the objective includes the correction optic and one or more other optical elements, further comprising a step of moving the correction optic with respect to the one or more other optical elements to place the correction optic at each of the two or more different settings.

Paragraph 13. The method of any of paragraphs 1 to 12, further comprising:
determining a value for at least one property or a combination of properties from each image of the plurality of images, wherein each property of the at least one property or combination of properties is selected from the group consisting of shape, size, intensity, location, and contrast of the reference in the image; and comparing the values for the plurality of images with one another; wherein the setting for the correction optic is selected based on comparing the values.

Paragraph 14. The method of paragraph 13, the method further comprising: adjusting the objective as the plurality of images is being captured based on values of the at least one property or combination of properties determined from a subset of the images already captured.

Paragraph 15. The method of paragraph 13 or 14, the method further comprising: adjusting the correction optic as the plurality of images is being captured based on values of the at least one property or combination of properties determined from a subset of the images already captured.

Paragraph 16. The method of any of paragraphs 1 to 15, the method further comprising: adjusting the objective based on feedback from a first subset of the plurality of images to position a centroid of an optical counterpart of the reference in a predetermined image region; and adjusting the correction optic and the objective based on feedback from a second subset of the plurality of images captured after the first subset, to maintain the optical counterpart in the predetermined image region while improving definition of the optical counterpart.

Paragraph 17. The method of any of paragraphs 1 to 16, wherein the step of selecting is performed by selecting a combination of a setting for the objective and a setting for the correction optic that optimizes at least one property or a combination of properties among the plurality of images.

Paragraph 18. The method of paragraph 17, wherein the step of selecting a combination includes comparing a first value of a property or combination of properties determined from an image captured with a first combination of the settings, and a second value of the property or combination of properties determined from another image captured with a second combination of the settings.

Paragraph 19. The method of paragraph 18, further comprising: determining a first location of the reference in the image captured with the first combination and a second location of the reference in the image captured with the second combination, wherein the first and second locations are substantially the same.

Paragraph 20. The method of any of paragraphs 17 to 19, further comprising a step of searching for the combination of a setting for the objective and a setting for the correction optic during the step of capturing using feedback from the imaging detector.

Paragraph 21. The method of paragraph 20, wherein the step of searching is based on a first property representing a location of the reference within each image of at least a subset of the images and a second property representing shape, size, intensity, and/or contrast of the reference in each image of at least a subset of the images.

Paragraph 22. The method of any of paragraphs 1 to 21, wherein at least two images of the plurality of images are captured at different settings of the objective while the correction optic has the same setting.

Paragraph 23. The method of any of paragraphs 1 to 22, wherein at least two images of the plurality of images are captured at different settings of the correction optic while the objective has a same z-position.

Paragraph 24. The method of any of paragraphs 1 to 23, wherein the surface is a distal surface of the sample holder, wherein the sample holder has a proximal surface that is parallel to the distal surface, and wherein the step of projecting includes passing light through the proximal surface to reach the distal surface, and reflecting light from the distal surface back through the proximal surface upstream of the imaging detector.

Paragraph 25. The method of any of paragraphs 1 to 24, wherein the sample includes biological cells.

Paragraph 26. The method of any of paragraphs 1 to 25, wherein the sample holder is a first sample holder, and wherein the sample is supported by the first sample holder or a second sample holder that is substantially identical to the first sample holder.

Paragraph 27. The method of paragraph 26, wherein the sample is located on the surface of the first sample holder or on a corresponding surface of the first or second sample holder.

Paragraph 28. The method of paragraph 26 or 27, wherein the surface forms a floor of a well of the first sample holder, and wherein the sample is located on a floor of a well of the first sample holder or the second sample holder.

Paragraph 29. The method of any of paragraphs 1 to 28, wherein the surface of the sample holder is a surface of a coverslip, and wherein the sample is located on the surface of the coverslip.

Paragraph 30. The method of any of paragraphs 1 to 29, wherein the step of imaging a sample includes epi-illuminating the sample.

Paragraph 31. The method of paragraph 30, wherein the step of imaging a sample includes detecting photoluminescence from the sample.

Paragraph 32. The method of paragraph 30 or 31, wherein a first light source produces light for the step of projecting and a second light source produces light for the step of imaging.

Paragraph 33. The method of any of paragraphs 1 to 32, wherein the step of imaging a sample includes trans-illuminating the sample.

Paragraph 34. The method of any of paragraphs 1 to 33, wherein the imaging detector is a first imaging detector, and wherein the step of imaging a sample is performed by capturing an image of the sample using a second imaging detector.

Paragraph 35. The method of any of paragraphs 1 to 34, wherein the imaging detector is in communication with a processor, and wherein the processor selects the setting for the correction optic.

Paragraph 36. The method of any of paragraphs 1 to 35, the method further comprising: manually adjusting the correction optic to place the correction optic at each of the different settings.

Paragraph 37. The method of paragraph 36, wherein the step of manually adjusting the correction optic includes a step of manually adjusting a correction collar of the objective.

Paragraph 38. The method of paragraph 36 or 37, wherein a processor instructs a user to manually adjust the correction optic to each of the different settings.

Paragraph 39. The method of any of paragraphs 1 to 36, further comprising automatically driving adjustment of the correction optic to place the correction optic at each of the different settings.

Paragraph 40. The method of any of paragraphs 1 to 39, wherein the correction optic is adjustable with an actuator, and wherein a processor controls operation of the actuator.

Paragraph 41. The method of any of paragraphs 1 to 40, wherein the plurality of images is captured at two or more different settings of the objective, and wherein a processor controls operation of an actuator that adjusts the objective to each of the different settings of the objective.

Paragraph 42. A system for imaging, comprising: (a) a stage to support a sample holder; (b) a light source; (c) a reference; (d) a set of optical elements, wherein the set includes an objective, an aperture, and a correction optic; (e) an imaging detector; wherein the light source and the set of optical elements are configured to project the reference onto the imaging detector by propagation of light from the light source generally along an optical axis that extends from the reference, through the objective, to a surface of the sample holder, and from the surface back through the objective to the imaging detector, wherein the aperture is an off-axis aperture that is spaced from the optical axis, and wherein the light propagates through the off-axis aperture; and (f) a processor configured to (1) control collection of a plurality of images of the reference using the imaging detector, with the correction optic at two or more different settings, and (2) select a setting for the correction optic based on the plurality of images.

Paragraph 43. The system of paragraph 42, further comprising an actuator operatively connected to the correction optic, wherein the processor is configured to control the actuator to place the correction optic at each of the two or more different settings.

Paragraph 44. The system of paragraph 42, further comprising an actuator operatively connected to the objective, wherein the processor is configured to control the actuator to focus an optical counterpart of the reference with the objective.

Paragraph 45. The system of paragraph 42, wherein the reference is integral to the light source.

Paragraph 46. The system of paragraph 42, wherein the light source includes a laser diode.

Paragraph 47. The system of paragraph 42, wherein the reference is a patterned object formed by a mask.

Paragraph 48. The system of paragraph 42, wherein the processor has access to data representing a predetermined image region in which an optical counterpart of the reference lies in captured images when the optical counterpart is substantially in focus on the imaging detector.

Paragraph 49. The method of paragraph 42, wherein a centroid of the optical counterpart changes location on the imaging detector if the objective and the sample holder are moved relative to one another along a z-axis.

Paragraph 50. The system of paragraph 42, wherein the optical axis has a first leg extending from the light source to the surface of the sample holder, and wherein the aperture is located upstream of the objective and radially offset from the first leg of the optical axis.

Paragraph 51. The system of paragraph 42, wherein the optical axis has a second leg extending from the surface of the sample holder to the imaging detector, and wherein the aperture is located downstream of the objective and radially offset from the second leg of the optical axis.

Paragraph 52. The system of paragraph 42, wherein the processor is configured to control capture of an image of a sample using light that interacts with the correction optic while the correction optic is at the selected setting.

Paragraph 53. The system of paragraph 52, wherein the imaging detector is a first imaging detector, the system further comprising a second imaging detector to capture the image of the sample.

Paragraph 54. The system of paragraph 42, wherein the correction optic is part of the objective.

Paragraph 55. The system of paragraph 42, wherein the correction optic is separate from the objective.

The term "exemplary" as used in the present disclosure, means "illustrative" or "serving as an example." Similarly, the term "exemplify," as used in the present disclosure, means "illustrate by given an example." Neither term implies desirability or superiority.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

I claim:

1. A method of imaging, the method comprising:
projecting a reference from a reference light source onto an imaging detector by propagation of light generally along an optical axis extending from the reference light source, through an objective, to a surface of a sample holder, and from the surface, back through the objective, to the imaging detector, wherein the light propagates through an off-axis aperture located upstream of the imaging detector and spaced from the optical axis;
capturing a plurality of images of the reference using the imaging detector with the objective and a correction optic at two or more different settings;

selecting, using a processor, a setting for the correction optic and the objective that optimizes one or more properties of the plurality of images;

actuating the correction optic and the objective to the best setting; and imaging a sample held by the sample holder by projecting illumination from a sample light source, through the objective, to a surface of the sample, back through the objective, to the imaging detector, wherein the light does not propagate through the off-axis aperture.

2. The method of claim 1, wherein the reference is a point source object.

3. The method of claim 1, wherein the reference light source for the step of projecting is produced by a laser diode, and wherein the reference is integral to the laser diode.

4. The method of claim 1, wherein the reference is a patterned object formed by a mask.

5. The method of claim 1, wherein the objective includes the correction optic and one or more other optical elements, further comprising a step of moving the correction optic with respect to the one or more other optical elements to place the correction optic at each of the two or more different settings.

6. The method of claim 1, further comprising:

determining values for the one or more image properties of the plurality of images, wherein each property is selected from the group consisting of shape, size, intensity, location, and contrast of the reference in the image; and comparing the values for the plurality of images with one another;

wherein the best setting for the correction optic and objective is selected based on comparing the values.

7. The method of claim 6, the method further comprising:

adjusting the objective as the plurality of images is being captured based on values of the at least one property or combination of properties determined from a subset of the images already captured.

8. The method of claim 6, the method further comprising:

adjusting the correction optic as the plurality of images is being captured based on values of the at least one property or combination of properties determined from a subset of the images already captured.

9. The method of claim 1, the method further comprising:

adjusting the objective based on feedback from a first subset of the plurality of images to position a centroid of an optical counterpart of the reference in a predetermined image region; and adjusting the correction optic and the objective based on feedback from a second subset of the plurality of images captured after the first subset, to maintain the optical counterpart in the predetermined region while improving definition of the optical counterpart.

10. The method of claim 1, further comprising a step of searching for a combination of a setting for the objective and a setting for the correction optic during the step of capturing using feedback from the imaging detector, wherein the step of searching is based on a first property representing a location of the reference within each image of at least a subset of the images and a second property representing shape, size, intensity, and/or contrast of the reference in each image of at least subset of the images.

11. The method of claim 1, wherein the surface is a distal surface of the sample holder, wherein the sample holder has a proximal surface that is parallel to the distal surface, and wherein the step of projecting includes passing light through the proximal surface to reach the distal surface, and reflecting light from the distal surface back through the proximal surface upstream of the imaging detector.

12. The method of claim 1, wherein the sample holder is a first sample holder, and wherein the sample is supported by the first sample holder or a second sample holder that is substantially identical to the first sample holder.

13. The method of claim 12, wherein the sample is located on the surface of the first sample holder or on a corresponding surface of the first or second sample holder.

14. The method of claim 1, the method further comprising:

manually adjusting a correction collar of the objective to place the correction optic at each of the different settings.

15. The method of claim 1, wherein actuating the correction optic and the objective to the best setting is performed automatically by an actuator under control of the processor.

16. The method of claim 1, wherein the reference light source and the sample light source are the same, and the method further comprises removing the off-axis aperture from the optical axis after the images of the reference are captured and before images of the sample are captured.

17. A system for imaging, comprising:

a stage to support a sample holder;

a reference light source;

a set of optical elements comprising an objective, an aperture, and a correction optic;

an imaging detector;

wherein the reference light source and the set of optical elements are configured to project a reference onto the imaging detector by propagation of light from the reference light source generally along an optical axis that extends from the reference light source through the objective, to a surface of the sample holder, and from the surface back through the objective to the imaging detector, wherein the aperture is an off-axis aperture that is spaced from the optical axis, and wherein the light propagates through the off-axis aperture; and a processor configured to:

control collection of a plurality of images of the reference using the imaging detector, with the correction optic and the objective at two or more different settings;

select a setting for the correction optic and the objective that optimizes one or more image properties of the plurality of images;

actuate the correction option and the objective to the best setting; and capture one or more images of a sample supported by the sample holder or a different sample holder that is substantially identical to the sample holder, wherein the images are captured by projecting illumination from a sample light source, through the objective, to a surface of the sample, back through the objective, to the imaging detector, wherein the light does not propagate through the aperture.

18. The system of claim 17, wherein the processor has access to data representing a predetermined image region in which an optical counterpart of the reference lies in captured images when the optical counterpart is substantially in focus on the imaging detector.

19. A method of imaging, the method comprising:

projecting a reference from a reference light source onto an imaging detector by propagation of light generally along an optical axis extending from the reference light source, through an objective, to a surface of a sample holder, and from the surface, back through the objective, to the imaging detector, wherein the light propagates through an off-axis aperture located upstream of the imaging detector and spaced from the optical axis;

capturing a plurality of images of the reference using the imaging detector by:
  capturing a first image-with a correction optic at a first setting and the objective at a first setting;
  actuating the correction optic to a second setting;
  capturing a second image;
  actuating the objective to a second setting; and
  capturing a third image;

selecting, using a processor, a best setting for the correction optic and a best setting for the objective based on one or more image properties of the plurality of images;

actuating the correction optic and the objective to the best setting; and imaging a sample held by the sample holder by projecting illumination from a sample light source, through the objective, to a surface of the sample, back through the objective, to the imaging detector, wherein the light does not propagate through the off-axis aperture.

\* \* \* \* \*